F. MESINGER.
SADDLE FOR MOTOR CYCLES.
APPLICATION FILED AUG. 29, 1908.
913,300.
Patented Feb. 23, 1909.
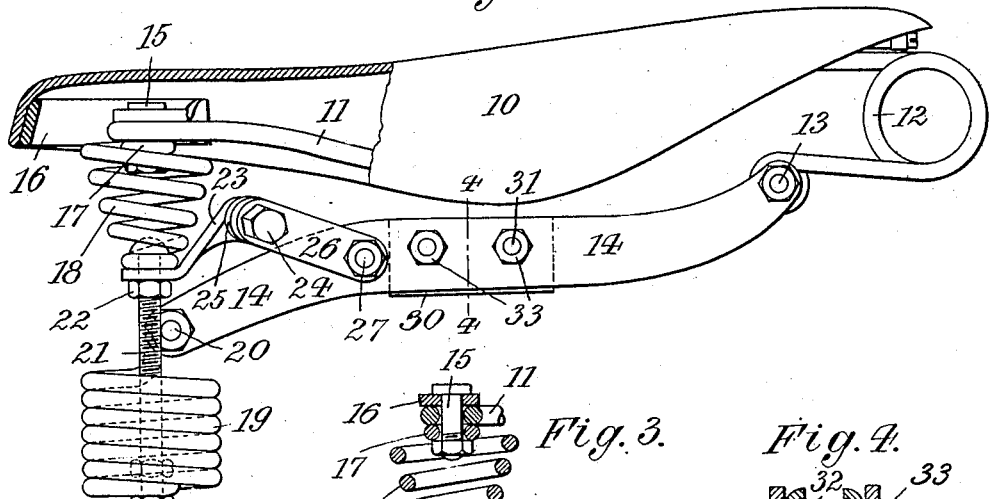
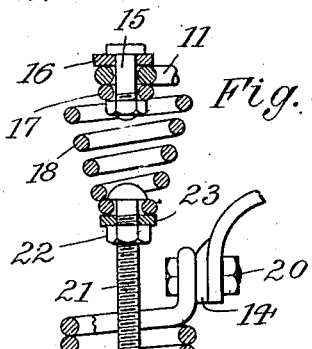
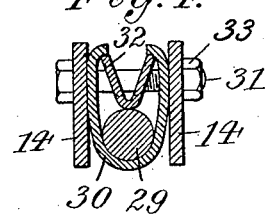
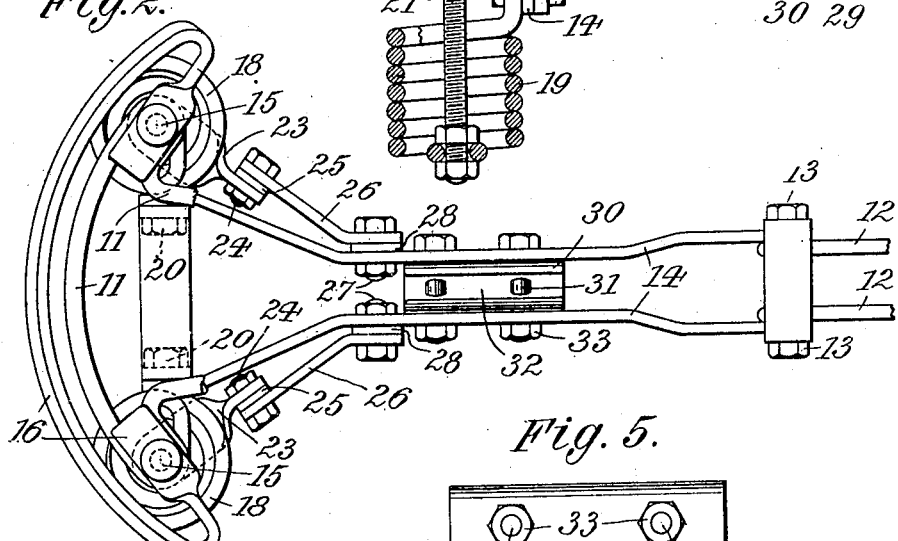
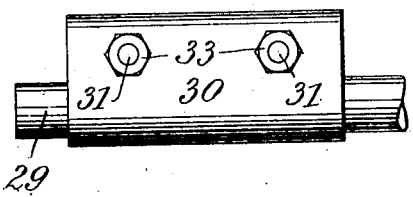
Witnesses:
Arthur E. Gumpe.
W. R. Schulz.
Inventor
Frederick Mesinger
By his Attorney

UNITED STATES PATENT OFFICE.

FREDERICK MESINGER, OF NEW YORK, N. Y.

SADDLE FOR MOTOR-CYCLES.

No. 913,300.　　　　　Specification of Letters Patent.　　　　Patented Feb. 23, 1909.

Application filed August 29, 1908. Serial No. 450,825.

*To all whom it may concern:*

Be it known that I, FREDERICK MESINGER, a citizen of the United States, residing at New York city, Bronx, county and State of New York, have invented new and useful Improvements in Saddles for Motor-Cycles, of which the following is a specification.

This invention relates to an improved saddle more particularly adapted for motor cycles and which is so constructed that an effective spring action is obtained, while swaying is prevented.

In the accompanying drawing: Figure 1 is a side elevation, partly broken away, of my improved saddle; Fig. 2 a plan of part thereof, with the seat omitted; Fig. 3 a section through one of the compound back springs; Fig. 4 a cross section on line 4—4, Fig. 1, and Fig. 5 a side view of the clamp.

The seat 10 of the saddle is provided with a stay-spring 11 and with a front suspension-spring 12, the ends of which are bolted at 13 to the saddle-frame composed of a pair of spaced shanks 14. To the back of spring 11 there is bolted at 15 a curved plate 16 adapted to support the rear of seat 10. Each bolt 15 is further encompassed by an eye 17 formed by the top convolute of a loosely wound coniform spring 18. This spring constitutes the upper member of a compound back spring, the lower member 19 of which is tightly wound and cylindrical in shape. Lower member 19 is arranged axially beneath upper member 18, and is secured to shank 14 by bolt 20. Springs 18, 19 are connected to each other by a pin 21 secured at its upper end to the bottom coil of spring 18, and at its lower end to the bottom coil of spring 19. To the lower end of spring 18 is clamped by pin 21 and nut 22, a perforated arm 23 connected by pivot 24, which carries fiber washer 25, to the rear end of a link 26. The front end of this link is connected by pivot 27, carrying fiber washer 28, to shank 14. Both pivots 24, 27 are so constructed that they may be readily tightened up in suitable manner, so that in this way the friction at the joints formed by said pivots may be adjusted.

In practice, springs 18 expand and contract freely under slight vibrations. On more pronounced vibrations, owing to the unevenness in the road, etc., springs 18 on being fully compressed will, by pins 21, actuate springs 19, so that the latter will constitute complements of the former. During this transmission of pressure, the degrees of expansion of springs 19 may be controlled by tightening or loosening the joints 24, 27. Owing to the tapering shape of springs 18, they may be partly telescoped by springs 19 during their play. It will be seen that arms 23 and links 26 constitute jointly a shock absorber, while they, at the same time, present means for setting springs 18, 19 to the weight of the rider.

The means for securing the saddle to the seat-post 29 consist of a trough-shaped resilient clamp-plate 30 that straddles the post and is held intermediate the two shanks 14 by bolts 31. Within the upper portion of plate 30 is contained a resilient V-shaped jaw 32 which abuts with its upper edges against the inwardly turned ends of plate 30, while its base bears upon post 29. Bolts 31 pass through shanks 14, as well as through plate 30 and jaw 32, so that by tightening up the nuts 33 on bolts 31, plate 30, as well as jaw 32, may be contracted to securely clamp the saddle to the seat post.

I claim:

1. A saddle provided with a frame, a compound back spring consisting of an upper member connected to the saddle and a lower member connected to the frame, means for connecting the members to each other, and pivoted means connecting the lower end of the upper member to the frame, substantially as specified.

2. A saddle provided with a frame, a compound back spring consisting of an upper member connected to the saddle and a lower member connected to the frame, means for connecting the members to each other, an arm engaging the lower end of the upper member, and a link connecting said arm to the frame, substantially as specified.

3. A saddle provided with a frame, a compound back spring consisting of an upper member connected to the saddle and a lower member, means for connecting the members to each other, pivoted means connecting the lower end of the upper member to the frame, and means for securing the upper end of the lower member to said frame, substantially as specified.

4. A saddle provided with a frame, a compound back spring consisting of an upper member connected to the saddle and a lower member, a pin connecting the lower ends of said members, pivoted means connecting the lower end of the upper member to the frame, and means for securing the upper end of the lower member to said frame, substantially as specified.

5. A saddle provided with a frame, a compound back spring consisting of an upper loosely wound coniform member connected to the saddle and a lower tightly wound cylindrical member, a pin connecting the lower ends of said members, pivoted means connecting the lower end of the upper member to the frame, and means for securing the upper end of the lower member to said frame, substantially as specified.

6. A saddle provided with a frame, a pair of shanks, a trough-shaped resilient clamp-plate intermediate the shanks and adapted to straddle the seat-post, a resilient V-shaped jaw within the clamp-plate adapted to engage said post with its base and the clamp plate with its upper ends, and means for contracting said plate and jaw, substantially as specified.

Signed by me at New York city, Manhattan, New York, this 27th day of August, 1908.

FREDERICK MESINGER.

Witnesses:
  AUGUST ERB,
  GEORGE KESSNER.